(12) United States Patent
Jha et al.

(10) Patent No.: US 11,760,504 B2
(45) Date of Patent: Sep. 19, 2023

(54) METHOD OF INDICATING A FLIGHT DIRECTION OF AN AERIAL VEHICLE, FLIGHT DIRECTION INDICATION SYSTEM FOR AN AERIAL VEHICLE, AND AERIAL VEHICLE

(71) Applicant: Goodrich Lighting Systems GmbH, Lippstadt (DE)

(72) Inventors: Anil Kumar Jha, Lippstadt (DE); Andreas Ueberschaer, Guetersloh (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 433 days.

(21) Appl. No.: 16/711,872

(22) Filed: Dec. 12, 2019

(65) Prior Publication Data
US 2021/0009284 A1    Jan. 14, 2021

(30) Foreign Application Priority Data
Jul. 14, 2019 (EP) ..................................... 19186182

(51) Int. Cl.
*B64D 47/06* (2006.01)
*G05D 1/10* (2006.01)
(Continued)

(52) U.S. Cl.
CPC ............ *B64D 47/06* (2013.01); *B64C 39/024* (2013.01); *G05D 1/0055* (2013.01);
(Continued)

(58) Field of Classification Search
CPC .. B64D 47/06; B64D 2203/00; B64C 39/024; B64C 2201/108; G05D 1/0055; G05D 1/1064; F21W 2107/30
See application file for complete search history.

(56) References Cited

U.S. PATENT DOCUMENTS

| 3,436,729 A * | 4/1969 | Zurcher ................. B64D 47/06 340/981 |
| 3,799,675 A * | 3/1974 | Johnson ................ G01S 1/7038 398/118 |

(Continued)

FOREIGN PATENT DOCUMENTS

| CN | 205060034 U | 3/2016 |
| EP | 2130766 A2 | 12/2009 |

(Continued)

OTHER PUBLICATIONS

European Search Report for Application No. 19186182.2-1010, dated Jan. 23, 2020, 8 pages.

*Primary Examiner* — Brian E Miller
(74) *Attorney, Agent, or Firm* — CANTOR COLBURN LLP

(57) ABSTRACT

A method of indicating a flight direction of an aerial vehicle, having a vehicle body and a plurality of rotors supported by the vehicle body, includes: on the basis of a momentary flight direction of the aerial vehicle, controlling a matrix of light sources, in particular a matrix of LEDs, which are mounted to the vehicle body of the aerial vehicle, to provide an illumination pattern to an observer of the aerial vehicle, with the illumination pattern comprising a flight direction indication, indicative of the momentary flight direction of the aerial vehicle.

12 Claims, 13 Drawing Sheets

(51) Int. Cl.
  *B64C 39/02* (2023.01)
  *G05D 1/00* (2006.01)
  *F21W 107/30* (2018.01)
(52) U.S. Cl.
  CPC ....... *G05D 1/1064* (2019.05); *B64D 2203/00* (2013.01); *F21W 2107/30* (2018.01)

(56) References Cited

U.S. PATENT DOCUMENTS

| | | | | |
|---|---|---|---|---|
| 5,381,312 | A * | 1/1995 | Authier | B64D 47/02 |
| | | | | 362/470 |
| 6,461,029 | B2 * | 10/2002 | Gronemeier | H05B 45/00 |
| | | | | 362/184 |
| 7,999,698 | B2 * | 8/2011 | Annati | B64D 47/06 |
| | | | | 701/9 |
| 9,745,079 | B2 * | 8/2017 | Jha | F21V 5/04 |
| 9,840,339 | B1 * | 12/2017 | O'Brien | G05D 1/0676 |
| 9,850,003 | B2 * | 12/2017 | Schoen | B64D 47/06 |
| 10,906,665 | B1 * | 2/2021 | Hessling-Von Heimendahl | |
| | | | | H05B 47/16 |
| 2005/0093718 | A1 * | 5/2005 | Martin | H05B 45/3577 |
| | | | | 340/981 |
| 2006/0007012 | A1 * | 1/2006 | Machi | H05B 47/235 |
| | | | | 340/815.45 |
| 2009/0303081 | A1 * | 12/2009 | Annati | B64D 47/06 |
| | | | | 340/945 |
| 2016/0046389 | A1 * | 2/2016 | Jha | F21V 5/048 |
| | | | | 362/470 |
| 2016/0280396 | A1 * | 9/2016 | Schoen | B64D 47/06 |
| 2017/0233099 | A1 | 8/2017 | Kuhara et al. | |
| 2017/0283088 | A1 * | 10/2017 | Sabe | G03B 15/03 |
| 2018/0090040 | A1 | 3/2018 | Randall et al. | |
| 2018/0273202 | A1 * | 9/2018 | Liu | B64C 27/00 |
| 2018/0312274 | A1 * | 11/2018 | Kessler | B64D 47/02 |
| 2021/0009283 | A1 * | 1/2021 | Pawliczek | B64D 47/06 |
| 2021/0009284 | A1 * | 1/2021 | Jha | G05D 1/1064 |
| 2021/0047051 | A1 * | 2/2021 | Hessling-Von Heimendahl | |
| | | | | B64D 47/06 |
| 2021/0276730 | A1 * | 9/2021 | Jha | B64D 47/02 |
| 2021/0298159 | A1 * | 9/2021 | Chen | B64C 39/024 |

FOREIGN PATENT DOCUMENTS

| | | |
|---|---|---|
| JP | 2004268722 A | 9/2004 |
| WO | 2014014071 A1 | 1/2014 |

* cited by examiner

METHOD OF INDICATING A FLIGHT DIRECTION OF AN AERIAL VEHICLE, FLIGHT DIRECTION INDICATION SYSTEM FOR AN AERIAL VEHICLE, AND AERIAL VEHICLE

FOREIGN PRIORITY

This application claims priority to European Patent Application No. 19186182.2 filed Jul. 14, 2019, the entire contents of which is incorporated herein by reference.

FIELD OF THE INVENTION

The present invention is in the field of aerial vehicles having a plurality of rotors, i.e. in the field of multicopters. In particular, the present invention is in the field of unmanned aerial vehicles having a plurality of rotors, i.e. in the field of drones having a multicopter design. Further in particular, the present invention is in the field of lighting systems for aerial vehicles having a plurality of rotors.

BACKGROUND

Recently, the use of drones/multicopters has increased significantly. Advances in the control and coordination of multiple rotors have made multicopters, in particular unmanned aerial vehicles (UAVs) of this kind, significantly more accessible and more reliable. A particularly popular type of unmanned aerial vehicle is a quadrocopter. Various types of multi-rotor unmanned aerial vehicles have been developed, e.g. for recreational purposes, for carrying cameras, etc. Multicopters are further envisioned for the delivery of goods, for other kinds of courier services, and even for transporting people. With the envisioned increase in drone traffic, flight safety is likely to become an increasing concern.

Accordingly, it would be beneficial to provide a method and a system for increasing the flight safety of multicopters, in particular of unmanned aerial vehicles having a plurality of rotors. Further in particular, it would be beneficial to provide a method and a system that allow for an enhanced safety of remotely operated multicopters.

SUMMARY

Exemplary embodiments of the invention include a method of indicating a flight direction of an aerial vehicle having a vehicle body and a plurality of rotors supported by the vehicle body. The method comprises, on the basis of a momentary flight direction of the aerial vehicle, controlling a matrix of light sources, which are mounted to the vehicle body of the aerial vehicle, to provide an illumination pattern to an observer of the aerial vehicle, with the illumination pattern comprising a flight direction indication, indicative of the momentary flight direction of the aerial vehicle.

Exemplary embodiments of the invention allow for the use of the matrix of light sources for providing a visual flight direction indication to an observer of the aerial vehicle/multicopter. When remotely controlling the aerial vehicle, for example when controlling the aerial vehicle via a remote control from the ground, the person handling the aerial vehicle may be provided with feedback about the momentary flight direction of the aerial vehicle. Also, other persons, such as operators of other aerial vehicles or any other kind of people who happen to be in the vicinity of the aerial vehicle, are provided with information about the momentary flight direction of the aerial vehicle in which the method is carried out. In this way, operators of other aerial vehicles and other people are more aware of the air space occupied by the aerial vehicle, in which the method is carried out, and more aware of the air space that the aerial vehicle is travelling into. In this way, the risk of collisions among aerial vehicles/multicopters and collisions between aerial vehicles/multicopters and other air-bourne or ground-operated vehicles may be reduced. The provision of a visual flight direction indication, indicative of the momentary flight direction of the aerial vehicle, provides for an increase in information about the path of travel of the aerial vehicle and thus may provide for an increase in flight safety regarding the air space in question. The flight direction indication may be an intuitively understandable symbol or a color-coded flight direction indication or any other suitable type of visual flight direction indication, as will be described in more detail below.

The method is provided for indicating a flight direction of an aerial vehicle having a vehicle body and a plurality of rotors supported by the vehicle body. Aerial vehicles having a plurality of rotors supported by the vehicle body are also referred to as multicopters. The method, as described herein, relates to indicating a flight direction of a multicopter. The plurality of rotors of the aerial vehicle may be substantially in one plane. In this way, the design of qudrocopters or other multicopters, which is per se known, may be used for the method described herein. With multicopters being highly agile aerial vehicles, capable of quickly and repeatedly changing their flight direction, the method of indicating a flight direction, as described herein, is highly effective in improving air space safety. As compared to existing multicopters, whose observation and control is based on a visual perception of the flight path of the multicopter as a whole, the provision of an illumination pattern comprising a flight direction indication, indicative of the momentary flight direction of the multicopter, may add an entirely new layer of flight safety.

The matrix of light sources may be a matrix of LEDs. With LEDs being small light sources and with LEDs having comparably low power demands, the matrix of LEDs may be implemented in a beneficial manner. Also, LED technology may provide for a highly reliable matrix of LEDs and for high brightness and, thus, good visibility of the flight direction indication. It is possible to employ other kinds of light sources as well. For example, liquid crystals may also be employed.

The matrix of light sources, in particular the matrix of LEDs, is mounted to the vehicle body of the aerial vehicle. The matrix of light sources, in particular the matrix of LEDs, may be directly attached to the vehicle body or may be mounted to the vehicle body via a mounting structure or may be attached to the vehicle body as part of a larger unit, such as part of a flight direction indication light unit.

The matrix of light sources is a substantially two-dimensional array of light sources, in particular a substantially two-dimensional array of LEDs. In particular, the light sources may be arranged on a substantially plane structure, such as on a plane circuit board, e.g. a plane printed circuit board. It is also possible that the light sources are arranged on a curved mounting structure, such as a curved mounting structure substantially corresponding to the curvature of the vehicle body. Both in the case of a substantially plane mounting structure and a curved mounting structure, when unrolled to a projection plane, the light sources are arranged as a two-dimensional array, having a plurality of rows/columns of light sources. In case the light sources are arranged on a curved mounting structure, the curvature is small compared to the lateral extension of the matrix of light sources, such that the matrix of light sources is perceived as an extended illumination structure by an observer, in particular as a substantially plane illumination structure, when the aerial vehicle is in flight and observed from the ground.

The matrix of light sources, in particular the matrix of LEDs, may comprise light sources/LEDs of a single color only or may comprise light sources/LEDs of different colors. The matrix of light sources may be seen as an array of illumination points, with each of the illumination points either consisting of a single light source of a particular color, resulting in a single-color implementation, or consisting of a group of light sources of different colors, resulting in a multi-color implementation. In the latter case, the group of light sources of different colors may allow for controlling the illumination point in question to emit a wide variety of different colors. For example, each group of light sources of different colors may have a red LED, a blue LED, and a green LED or may have a red LED, a blue LED, a green LED, and a white LED.

The matrix of light sources, in particular the matrix of LEDs, may comprise at least three illumination points in each dimension, in particular at least five illumination points in each dimension, further in particular at least 10 illumination points in each dimension, further in particular at least 100 illumination points in each dimension, and further in particular at least 1000 illumination points in each dimension.

The method includes controlling the matrix of light sources, in particular the matrix of LEDs, to provide an illumination pattern to an observer of the aerial vehicle. The light sources of the matrix of light sources are individually controllable. The illumination pattern may be achieved by a set of individual control commands to the light sources. The matrix of light sources may be seen as a kind of screen, on which the illumination pattern is displayed to the observer. The matrix of light sources, in particular the matrix of LEDs, provides a very flexible means of providing different illumination patterns over time.

According to a further embodiment, the matrix of light sources, in particular the matrix of LEDs, is mounted to a lower side/an underside of the vehicle body of the aerial vehicle and the illumination pattern is provided to an observer below the aerial vehicle. In this way, the flight direction indication may be immediately communicated to observers of the aerial vehicle on the ground. Also, the lower side/underside of the vehicle body may be an extended structure, to which the matrix of light sources can be conveniently mounted. Further, the matrix of light sources may be provided over a substantial portion or most of the lower side/underside of the vehicle body, allowing for an extended illumination pattern, which can be recognized well from the ground.

According to a further embodiment, the matrix of light sources, in particular the matrix of LEDs, is mounted to an upper side of the vehicle body of the aerial vehicle and the illumination pattern is provided to an observer above the aerial vehicle. In this way, the flight direction indication is effectively communicated to observers above the aerial vehicle, such as pilots of small recreational air planes. Also, the upper side of the vehicle body may be an extended structure, to which the matrix of light sources can be conveniently mounted. Also, the matrix of light sources may be provided over a substantial portion or most of the upper side of the vehicle body, allowing for an extended illumination pattern, which can be recognized well by observers.

It is also possible that a first matrix of light sources, in particular a first matrix of LEDs, is mounted to an upper side of the vehicle body of the aerial vehicle and that a second matrix of light sources, in particular a second matrix of LEDs, is mounted to a lower side of the vehicle body of the aerial vehicle. In this way, the flight direction indication can be effectively communicated to both observers above and below the aerial vehicle.

According to a further embodiment, the illumination pattern is a static illumination pattern. In this way, the flight direction indication can be communicated to observers over an extended period of time. This in turn allows for the same information being communicated, irrespective of the exact point in time the observer is looking towards the aerial vehicle. The illumination pattern may be seen as static when provided for a time period of more than 1 s, in particular of more than 5 s, further in particular of more than 10 s or more than 20 s. It is also possible that the static illumination pattern is continuously provided, until a change in momentary flight direction calls for a different flight direction indication.

According to a further embodiment, the illumination pattern is a dynamic illumination pattern. With a dynamic illumination pattern, a higher level of attention to the flight direction indication on the part of the observer may be achieved. Also, a higher degree of freedom for different kinds of flight direction indications may be achieved. The dynamic illumination pattern may convey the flight direction indication to the observer in a particularly intuitive manner. The term dynamic illumination pattern refers to a sequence of instances of illuminating different subsets of the light sources of the matrix of light sources. The switching between the instances of illuminating different subsets may be carried out at such speeds that the observer perceives a notable change in illumination when looking towards the aerial vehicle for a common passerby duration. In particular, the instances of illumination may be shorter than 1 s, in particular shorten than 0.5 s, further in particular shorter than 0.2 s. It is possible that the dynamic illumination pattern is repeatedly provided, until a change in momentary flight direction calls for a different flight direction indication. According to a particular embodiment, when a new instance of illuminating a particular subset of the light sources of the matrix of light sources takes place, the light sources of the previously illuminated subset may be illuminated with reduced intensity, i.e. in a dimmed manner. In this way, an afterglow effect may be provided in the dynamic illumination pattern. This in turn may enhance the directivity conveyed by the dynamic illumination pattern, thus providing a highly effective flight direction indication.

According to a further embodiment, the illumination pattern comprises at least one of: a flight direction indication symbol, such as a line or an arrow, a color-coded flight direction indication, an illumination pattern travelling across the matrix of light sources, and an expanding or collapsing illumination pattern. With all of the above illumination patterns/illumination pattern elements, an intuitive and/or easily recognizable flight direction indication may be provided to observers of the aerial vehicle. The different illumination pattern elements may also be combined, either in a one-after-the-other manner, i.e. in a time sequence manner, or by providing the different illumination pattern elements in different portions of the matrix of light sources or by combining different illumination pattern elements, such as in a color-coded flight direction indication symbol.

According to a further embodiment, the illumination pattern comprises a vertical flight direction indication, indicative of a vertical component of the momentary flight direction of the aerial vehicle. In this way, a rising and/or declining action of the aerial vehicle can be effectively indicated to observers of the aerial vehicle. This is particularly useful, as the human eye tends to be less sensitive to an object approaching or departing, as compared to a transverse motion. The indication of the rising/declining motion is therefore highly valuable to observers.

According to a further embodiment, the illumination pattern comprises a frame-like element, in particular a red frame-like element, dynamically collapsing towards the center of the matrix of light sources, in response to the vertical component of the momentary flight direction being downwards, and/or the illumination pattern comprises a frame-like element, in particular a green frame-like element, dynamically expanding towards the edges of the matrix of light sources, in response to the vertical component of the momentary flight direction being upwards. With the frame-like element dynamically collapsing towards the center of the matrix of light sources or expanding towards the edges of the matrix of light sources, a zooming in/zooming out effect may be achieved. Such an effect can be intuitively associated with an approach or a departure of the aerial vehicle, thus allowing for a highly effective indication of the vertical component of the momentary flight direction. The described collapsing of the frame-like element for a downwards motion of the aerial vehicle and the described expanding of the frame-like element for an upwards motion of the aerial vehicle may provide for a particularly intuitive perception, when viewed from below the aerial vehicle, i.e. when the matrix of light sources is mounted to a lower side of the aerial vehicle. For the matrix of light sources being mounted to an upper side of the aerial vehicle, the collapsing/expanding of the frame-like element may be reversed for the upwards/downwards momentary flight directions. The frame-like element may be a continuous frame element or an interrupted frame element.

According to a further embodiment, the illumination pattern comprises a horizontal flight direction indication, indicative of a horizontal component of the momentary flight direction of the aerial vehicle. In this way, a transverse motion of the aerial vehicle can be effectively indicated to observers of the aerial vehicle.

According to a further embodiment, the illumination pattern comprises a line element, dynamically travelling across the matrix of light sources. The travelling direction of the line element is substantially aligned with the horizontal component of the momentary flight direction of the aerial vehicle. In this way, the travelling of the line across the matrix of light sources resembles the momentary flight direction of the aerial vehicle, thus providing an easily recognizable flight direction indication. The line element may travel across the matrix of light sources substantially in the longitudinal direction of extension of the line element or substantially transverse to the longitudinal direction of extension of the line element. The line element may have a color gradient and/or an intensity gradient along its longitudinal extension, which may further enhance the effectiveness of the flight direction indication.

According to a further embodiment, the illumination pattern comprises a static line element, having a color gradient and/or intensity gradient along its longitudinal direction of extension, and/or a static flight direction indication symbol, such as an arrow. The orientation of the static line element and/or the pointing direction of the static flight direction indication symbol is substantially aligned with the horizontal component of the momentary flight direction of the aerial vehicle. In this way, a highly effective indication of the horizontal component of the momentary flight direction may be achieved with a static illumination pattern.

According to a further embodiment, the illumination pattern comprises a vertical flight direction indication, indicative of a vertical component of the momentary flight direction of the aerial vehicle, and a horizontal flight direction indication, indicative of a horizontal component of the momentary flight direction of the aerial vehicle. For example, a color-coded frame may indicate the vertical component of the momentary flight direction being upwards or downwards, while a line element or a flight direction indication symbol, being provided within the color-coded frame, may indicate the horizontal component of the momentary flight direction. The vertical flight direction indication and the horizontal flight direction indication may also be provided subsequent to each other, potentially in an alternating manner.

Exemplary embodiments of the invention further include a flight direction indication system for an aerial vehicle having a vehicle body and a plurality of rotors supported by the vehicle body, the flight direction indication system comprising: a matrix of light sources, in particular a matrix of LEDs, mountable to the vehicle body of the aerial vehicle; and a control unit, coupled to the matrix of light sources; wherein the control unit is configured to control the matrix of light sources on the basis of a momentary flight direction of the aerial vehicle to provide an illumination pattern to an observer of the aerial vehicle, with the illumination pattern comprising a flight direction indication, indicative of the momentary flight direction of the aerial vehicle. The additional features, modifications, and effects, described herein with respect to the method of indicating a flight direction of an aerial vehicle, apply to the flight direction indication system in an analogous manner. Conversely, the additional features, modifications, and effects, described herein with respect to the flight direction indication system, apply to the method of indicating a flight direction of an aerial vehicle in an analogous manner.

According to a further embodiment, the flight direction indication system comprises a light unit housing and a lens cover, wherein the matrix of light sources is arranged within the light unit housing and is covered by the lens cover and wherein the light unit housing is receivable in a corresponding recess of the vehicle body of the aerial vehicle. In particular, the flight direction indication system may be implemented as a light unit for an aerial vehicle. The light unit may be attached to or embedded into the vehicle body of the aerial vehicle. When embedded into the vehicle body of the aerial vehicle, the lens cover may be flush with the vehicle body. In this way, the aerodynamic impact of the flight direction indication system may be kept low. The control unit may be part of the light unit or may be arranged outside of the light unit and coupled thereto via a suitable wireless or wired communication link.

According to a further embodiment, the flight direction indication system further comprises a flight direction sensor for detecting the momentary flight direction of the aerial vehicle. The flight direction sensor may be coupled to the control unit and may provide a flight direction signal, indicative of the momentary flight direction, to the control unit. By providing a flight direction sensor as part of the flight direction indication system, the flight direction indication system is autonomous in terms of controlling the matrix of light sources depending on the momentary flight direction of the aerial vehicle.

According to a further embodiment, the flight direction indication system further comprises a flight direction signal input for receiving a flight direction signal indicative of the momentary flight direction of the aerial vehicle. The flight direction signal input may be part of the control unit of the flight direction indication system. The flight direction signal may be received from a flight control unit of the aerial vehicle. In this way, the control unit of the flight direction indication system may receive the momentary flight direction of the aerial vehicle from an external entity that has said information readily available. In this way, no additional hardware for determining the momentary flight direction of the aerial vehicle is necessary.

Exemplary embodiments of the invention further include an aerial vehicle comprising a vehicle body, a plurality of rotors supported by the vehicle body, and a flight direction indication system, as described in any of the embodiments above. The plurality of rotors may be supported by the vehicle body via a plurality of rotor support arms. The additional features, modifications, and effects, as described above with respect to the flight direction indication system, apply to the aerial vehicle in an analogous manner.

According to a further embodiment, the aerial vehicle comprises between 3 and 10 rotors, in particular between 4 and 8 rotors, further in particular 4 rotors or 8 rotors. The latter numbers of rotors refer to the aerial vehicle being a quadrocopter or octocopter.

BRIEF DESCRIPTION OF FIGURES

Further exemplary embodiments of the invention are described below with reference to the enclosed drawings, wherein.

DETAILED DESCRIPTION

Figure 1:
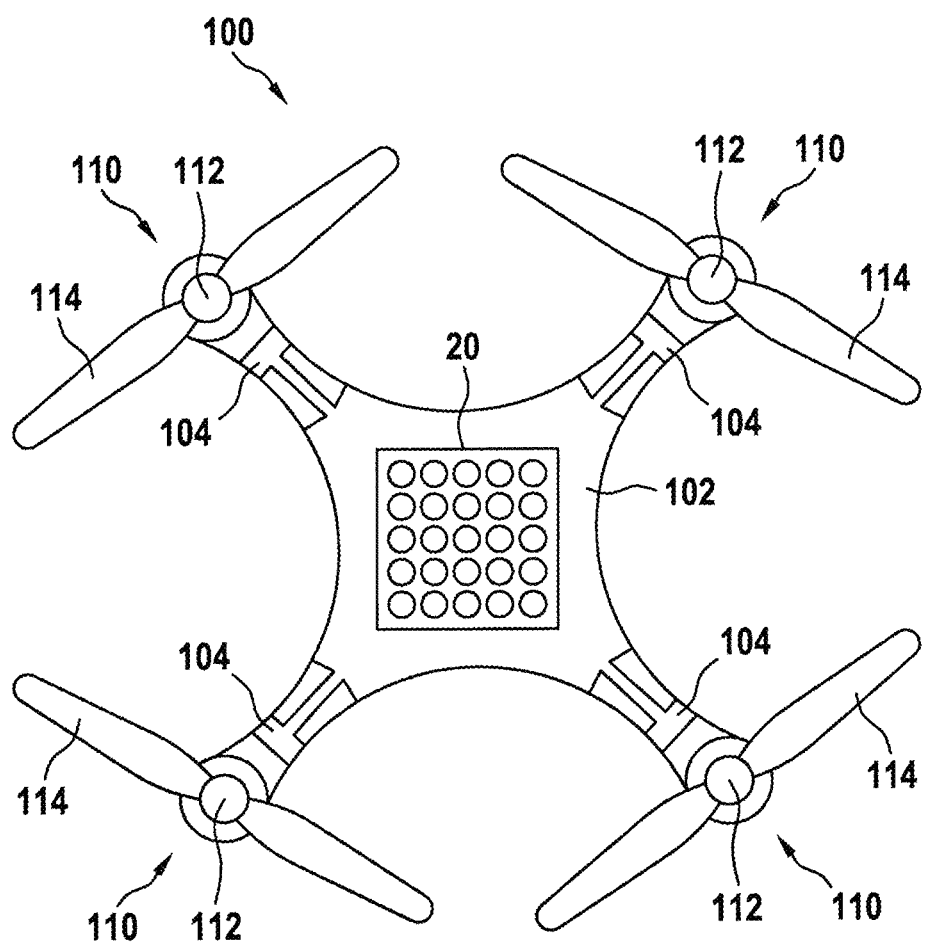
FIG. 1 shows an aerial vehicle in accordance with an exemplary embodiment of the invention in a schematic bottom view.

FIG. 1 shows an aerial vehicle 100 in accordance with an exemplary embodiment of the invention in a schematic bottom view. The aerial vehicle 100 is a multicopter. In particular, the aerial vehicle 100 is a quadrocopter in the exemplary embodiment of FIG. 1, i.e. it has four rotors. In the exemplary embodiment of the invention, the aerial vehicle 100 is an unmanned aerial vehicle (UAV). The aerial vehicle may have a smaller or greater number of rotors, such as eight rotors, thus operating as an octocopter. The aerial vehicle may be an unmanned aerial vehicle or a manned aerial vehicle, such as an air taxi.

The aerial vehicle 100 has a vehicle body 102. The vehicle body 102 may be configured for carrying utilities or delivery goods or any other kind of goods to be carried. The vehicle body 102 comprises four rotor support arms 104. Each of the four rotor support arms 104 supports a rotor 110.

Each of the four rotors 110 has a rotor hub 112 and two rotor blades 114. In the exemplary embodiment of FIG. 1, the two rotor blades 114 of each rotor 110 are separate elements, each element individually mounted to the rotor hub 112. The two rotor blades 114 of each rotor 110 may also be formed as an integrated structure and may be attached to the rotor hub 112 as a single integrated element. It is pointed out that the rotors 110 may have a larger number of rotor blades as well.

In operation, the rotor blades 114 rotate around the rotor hub 112 and provide lift to the aerial vehicle 100. The rotating speed of the rotor blades 114 of the rotors 110 are controlled by a flight control unit of the aerial vehicle 100. By adapting the relative rotating speeds of the four rotors 110, the aerial vehicle 100 is steerable and can be flown into desired flight directions. The mechanics of flying and steering a multicopter are known to the skilled person.

A matrix of LEDs 20 is mounted to the vehicle body 102, in particular to a lower central portion of the vehicle body 102. For illustrative purposes, the matrix of LEDs 20 is shown to have 5×5 illumination points. Each illumination point may consist of one LED or of a plurality of LEDs of different colors. It is understood that the matrix of LEDs 20 may have a greater number of illumination points. It is also understood that the matrix of LEDs 20 may be a non-square matrix of LEDs, i.e. a matrix of LEDs having different sizes in the two matrix dimensions.

The matrix of LEDs 20 is part of a flight direction indication system in accordance with exemplary embodiments of the invention, as will be explained below. During flight of the aerial vehicle 100, different illumination patterns are provided by the matrix of LEDs 20, depending on the momentary flight direction of the aerial vehicle 100. In particular, methods of indicating a flight direction in accordance with exemplary embodiments of the invention may be implemented to be carried out by the aerial vehicle 100.

Figure 2:
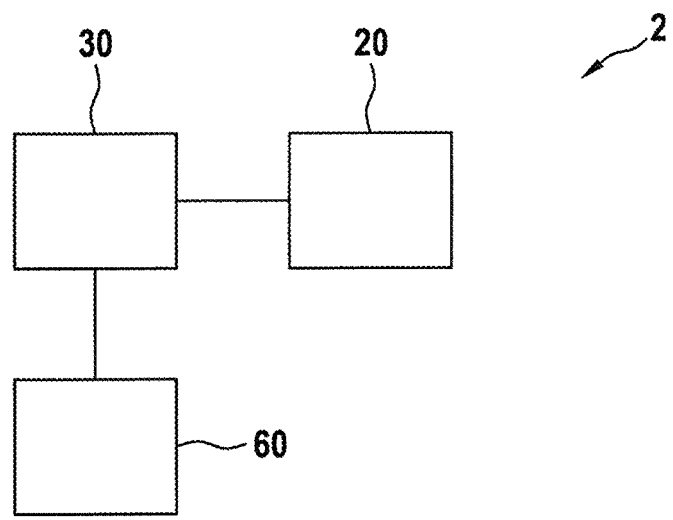
FIG. 2 shows a flight direction indication system in accordance with an exemplary embodiment of the invention in a block diagram.

FIG. 2 shows a flight direction indication system 2 in accordance with an exemplary embodiment of the invention in a block diagram. The flight direction indication system 2 comprises a matrix of LEDs 20, a control unit 30, coupled to the matrix of LEDs 20, and a flight direction sensor 60, coupled to the control unit 30. The flight direction indication system 2 is configured to be installed in an aerial vehicle having a plurality of rotors, i.e. in a multicopter.

In operation, the flight direction sensor 60 determines the momentary flight direction of the aerial vehicle and provides a flight direction signal, indicative of the momentary flight direction, to the control unit 30. On the basis of the momentary flight direction of the aerial vehicle, the control unit 30 controls the matrix of LEDs 20 to provide an illumination pattern that comprises a flight direction indication, indicative of the momentary flight direction of the aerial vehicle. The control unit 30 is configured to control each of the LEDs of the matrix of LEDs individually.

By way of the flight direction sensor 60, the control unit 30 is provided with the momentary flight direction of the aerial vehicle to which the flight direction indication system 2 is installed. In addition/as an alternative, the control unit 30 may have a flight direction signal input for receiving a flight direction signal, indicative of the momentary flight direction of the aerial vehicle, from a source outside of the flight direction indication system 2. For example, the control unit 30 may be coupled to a flight control unit of the aerial vehicle for receiving the flight direction signal.

Figure 3:
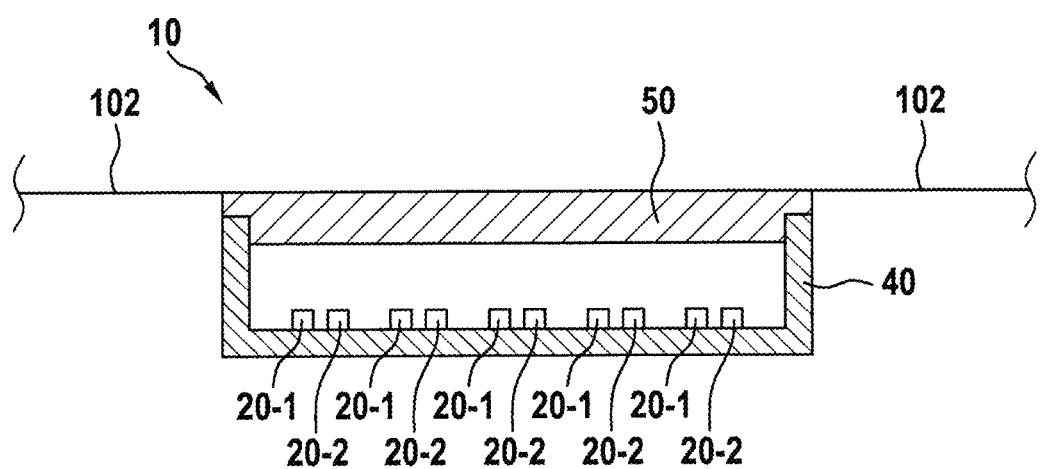
FIG. 3 shows a light unit including various components of a flight direction indication system in accordance with an exemplary embodiment of the invention in a schematic cross-sectional view.

FIG. 3 shows a light unit 10 that includes various components of a flight direction indication system in accordance with an exemplary embodiment of the invention in a schematic cross-sectional view. The light unit 10 is embedded into the vehicle body 102 of an aerial vehicle in accordance with exemplary embodiments of the invention. For clarity of illustration, only a small portion of the vehicle body 102 is shown in FIG. 3.

The light unit 10 comprises a light unit housing 40 and a lens cover 50. The light unit housing 40 and the lens cover 50 define an inner space of the light unit 10. A matrix of LEDs is arranged in the inner space of the light unit 10. For illustrative purposes, the matrix of LEDs again comprises 5×5 illumination points in the exemplary embodiment of FIG. 3. The cross-sectional view of FIG. 3 cuts through a row of five illumination points. In the exemplary embodiment of FIG. 3, each illumination point of the matrix of LEDs comprises four LEDs of different colors. In particular, each illumination point of the matrix of LEDs comprises a red LED 20-1, a green LED 20-2, a blue LED, and a white LED. For each of the illumination points, the red LED 20-1, the green LED 20-2, the blue LED, and the white LED are arranged in a square cluster arrangement. For this reason, only two of the four LEDs of each illumination point are depicted in the cross-sectional plane of FIG. 3. With red, green, blue, and white LEDs being available for each illumination point of the matrix of LEDs, a very large variety of colors may be emitted by each illumination point. Accordingly, a large degree of freedom is provided for the illumination patterns that may be emitted by the matrix of LEDs.

The matrix of LEDs is mounted to the light unit housing 40. The matrix of LEDs may be mounted to a circuit board, such as a printed circuit board, which may in turn be fastened to the light unit housing 40. The lens cover 50 is transparent for allowing the light from the matrix of LEDs to exit the light unit 10 and travel to the observer of the aerial vehicle. The control unit, as described above with respect to FIG. 2, may be arranged in the light unit 10, i.e. it may be part of the light unit 10, or may be arranged outside of the light unit 10 and coupled thereto. The light unit 10 may be a complete implementation of a flight direction indication system in accordance with an exemplary embodiment of the invention or may be an implementation of various components of a flight direction indication system in accordance with an exemplary embodiment of the invention.

FIG. 4 shows an aerial vehicle 100 in accordance with an exemplary embodiment of the invention in a schematic bottom view, with the flight direction indication system of the aerial vehicle 100 providing exemplary flight direction indications. The depicted flight direction indications are the result of a method of indicating a flight direction of the aerial vehicle 100 in accordance with exemplary embodiments of the invention. The aerial vehicle 100 may be the aerial vehicle 100 of FIG. 1. For the purpose of clear illustration, many of the reference numbers of FIG. 1 are omitted from FIG. 4. Still, the description given with respect to FIG. 1 applies to FIG. 4 in an analogous manner.

Figure 4A:
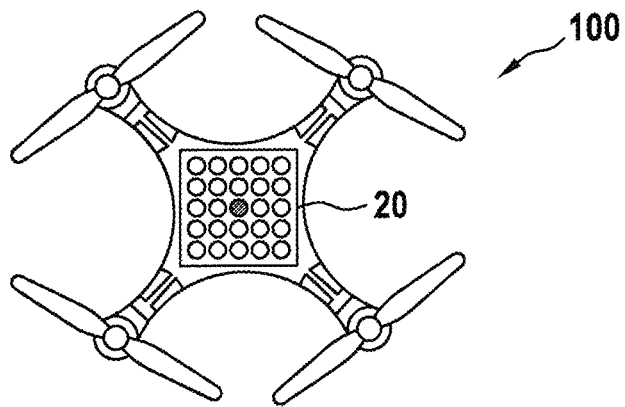
FIGS. 4A-4F show an aerial vehicle in accordance with an exemplary embodiment of the invention in a schematic bottom view, with the flight direction indication system of the aerial vehicle providing exemplary flight direction indications.
Figure 4B:
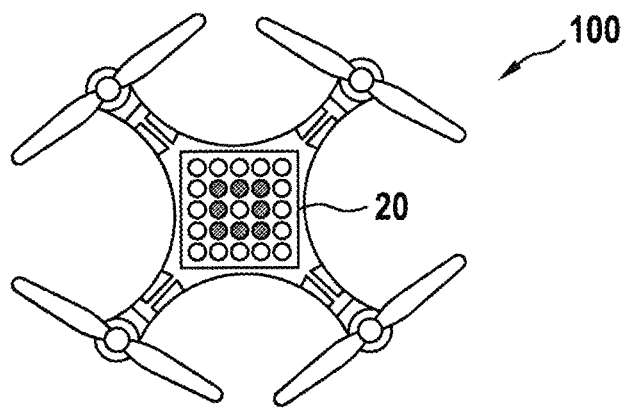
Figure 4C:
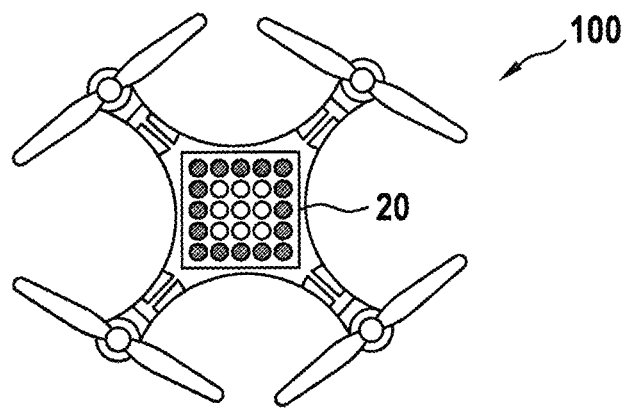

FIGS. 4A, 4B, and 4C illustrate the provision of a dynamic illumination pattern comprising a flight direction indication that is indicative of an upwards momentary flight direction of the aerial vehicle 100.

The dynamic illumination pattern comprises a frame-like element that expands towards the edges of the matrix of LEDs 20, with three snap shots in time of said dynamic illumination pattern being depicted in FIGS. 4A, 4B, and 4C. The currently illuminated illumination points of the matrix of LEDs 20 are depicted as hatched circles, while the currently non-illuminated illumination points of the matrix of LEDs 20 are depicted as empty circles. The expansion of the frame-like element towards the edges of the matrix of LEDs 20 may also be seen as a development of a perimetric frame from a single illumination point in the center of the matrix of LEDs 20. The expansion of a frame-like element provides the perception of a zooming out of the illumination pattern, thus providing a highly intuitive flight direction indication, indicating a departing aerial vehicle, to an observer on the ground. The illuminated illumination points of the matrix of LEDs 20 may be illuminated in green or in any other suitable color.

Figure 4D:
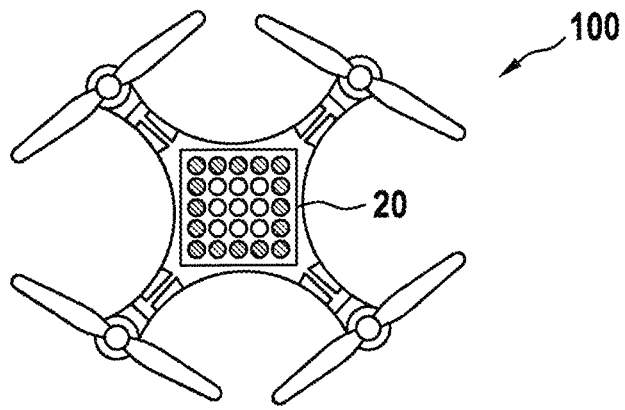
Figure 4E:
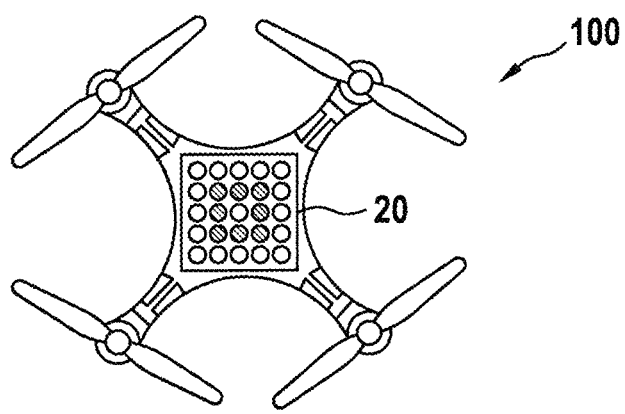
Figure 4F:
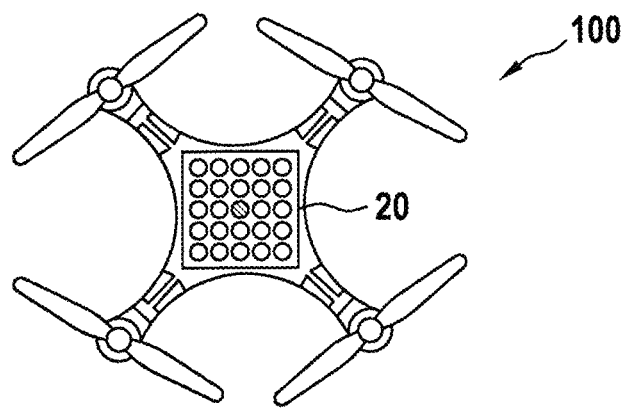

FIGS. 4D, 4E, and 4F illustrate the provision of a dynamic illumination pattern comprising a flight direction indication that is indicative of a downwards momentary flight direction of the aerial vehicle 100.

The dynamic illumination pattern comprises a frame-like element that collapses towards the center of the matrix of LEDs 20, with three snap shots in time of said dynamic illumination pattern being depicted in FIGS. 4D, 4E, and 4F. The currently illuminated illumination points of the matrix of LEDs 20 are depicted as hatched circles, while the currently non-illuminated illumination points of the matrix of LEDs 20 are depicted as empty circles. The collapse of the frame-like element towards the center of the matrix of LEDs 20 may also be seen as a breakdown of a perimetric frame to a single illumination point in the center of the matrix of LEDs 20. The collapse of a frame-like element provides the perception of a zooming in of the illumination pattern, thus providing a highly intuitive flight direction indication, indicating an approaching aerial vehicle, to an observer on the ground. The illuminated illumination points of the matrix of LEDs 20 may be illuminated in red or in any other suitable color.

FIG. 5 shows an aerial vehicle 100 in accordance with an exemplary embodiment of the invention in a schematic bottom view, with the flight direction indication system of the aerial vehicle 100 providing exemplary flight direction indications. The depicted flight direction indications are the result of a method of indicating a flight direction of the aerial vehicle 100 in accordance with exemplary embodiments of the invention. The aerial vehicle 100 may be the aerial vehicle 100 of FIG. 1. For the purpose of clear illustration, many of the reference numbers of FIG. 1 are omitted from FIG. 5. Still, the description given with respect to FIG. 1 applies to FIG. 5 in an analogous manner.

Figure 5A:
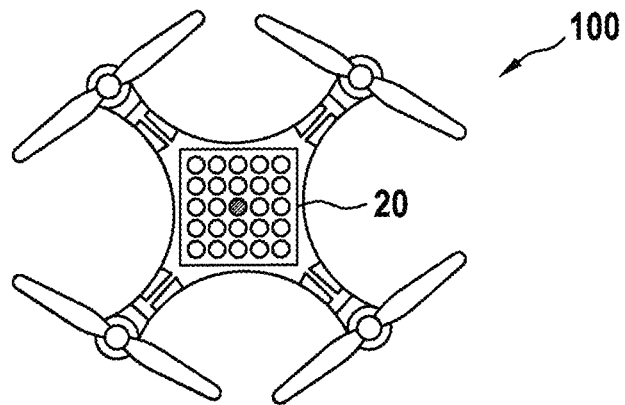
FIGS. 5A-5F shows an aerial vehicle in accordance with an exemplary embodiment of the invention in a schematic bottom view, with the flight direction indication system of the aerial vehicle providing further exemplary flight direction indications.
Figure 5B:
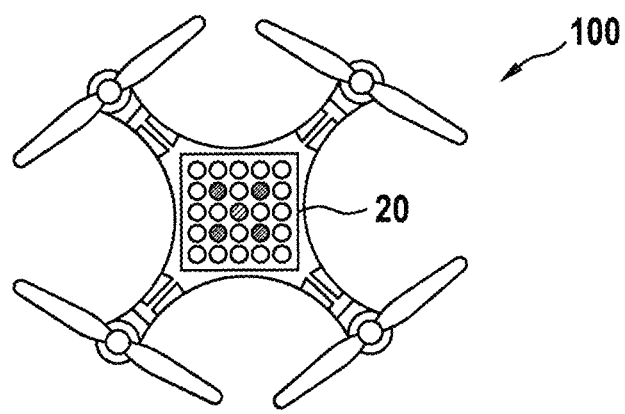
Figure 5C:
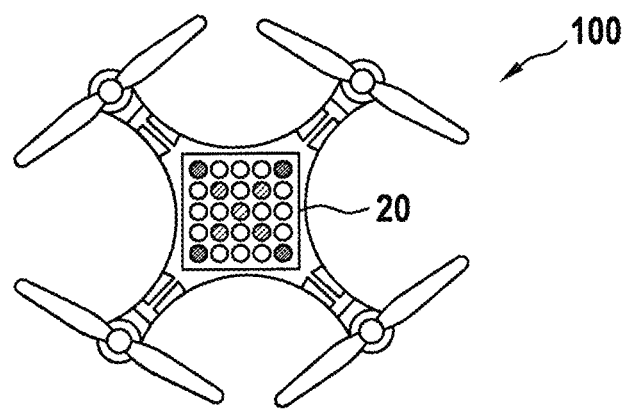
Figure 5D:
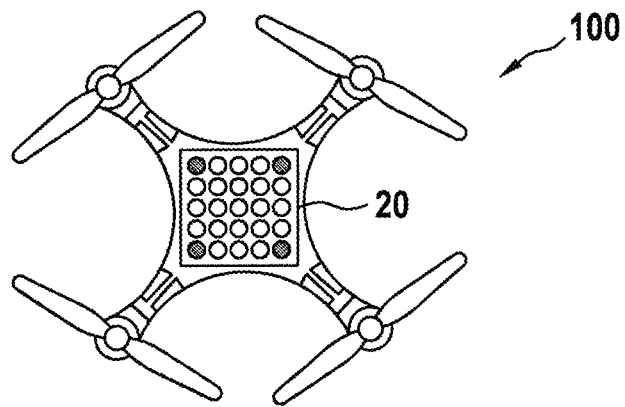
Figure 5E:
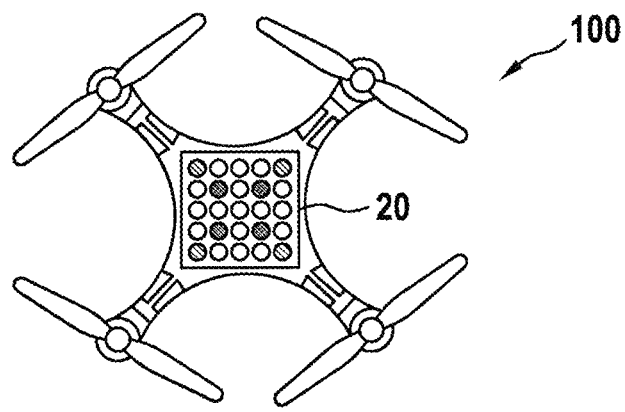
Figure 5F:
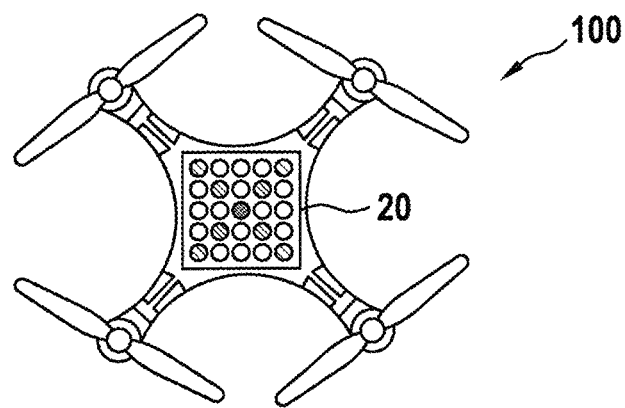

Similar to FIG. 4, FIGS. 5A, 5B, and 5C illustrate the provision of a dynamic illumination pattern comprising a flight direction indication that is indicative of an upwards momentary flight direction of the aerial vehicle 100, and FIGS. 5D, 5E, and 5F illustrate the provision of a dynamic illumination pattern comprising a flight direction indication that is indicative of a downwards momentary flight direction of the aerial vehicle 100.

The dynamic illumination patterns of FIG. 5 differ from the dynamic illumination patterns of FIG. 4 in two aspects. First, the expanding illumination pattern of FIGS. 5A, 5B, and 5C, which again indicates an upward motion of the aerial vehicle 100 to an observer on the ground, does not comprise a full frame, but an expansion of the four corner points of a frame. This may also be seen as an expansion of an interrupted frame-like element or as an expansion of a discontinuous, frame-like element. The same holds true for the collapsing illumination pattern of FIGS. 5D, 5E, and 5F, which again indicates a downward motion of the aerial vehicle 100 to an observer on the ground. Second, both the expanding illumination pattern of FIGS. 5A, 5B, and 5C and the collapsing illumination pattern of FIGS. 5D, 5E, and 5F have an afterglow effect. During the expansion/collapse of the frame-like element, different subsets of LEDs are illuminated over time. When a new subset of LEDs is illuminated, the previously illuminated LEDs stay illuminated, albeit with a lower intensity/in a dimmed manner. This continued illumination may apply to all previously illuminated subsets or only to the most/more recent previously illuminated subset/subsets. This afterglow enhances the dynamic perception of the illumination pattern and allows for an easily recognizable flight direction indication. Again, the dynamic expanding illumination pattern of FIGS. 5A, 5B, and 5C may be in green, and the dynamic collapsing illumination pattern of FIGS. 5D, 5E, and 5F may be in red.

FIG. 6 shows an aerial vehicle 100 in accordance with an exemplary embodiment of the invention in a schematic bottom view, with the flight direction indication system of the aerial vehicle 100 providing exemplary flight direction indications. The depicted flight direction indications are the result of a method of indicating a flight direction of the aerial vehicle 100 in accordance with exemplary embodiments of the invention. The aerial vehicle 100 may be the aerial vehicle 100 of FIG. 1. For the purpose of clear illustration, many of the reference numbers of FIG. 1 are omitted from FIG. 6. Still, the description given with respect to FIG. 1 applies to FIG. 6 in an analogous manner.

Figure 6A:
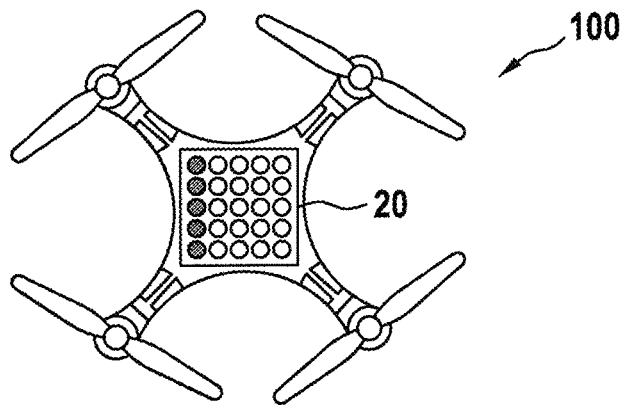
FIGS. 6A-6I show an aerial vehicle in accordance with an exemplary embodiment of the invention in a schematic bottom view, with the flight direction indication system of the aerial vehicle providing further exemplary flight direction indications.
Figure 6B:
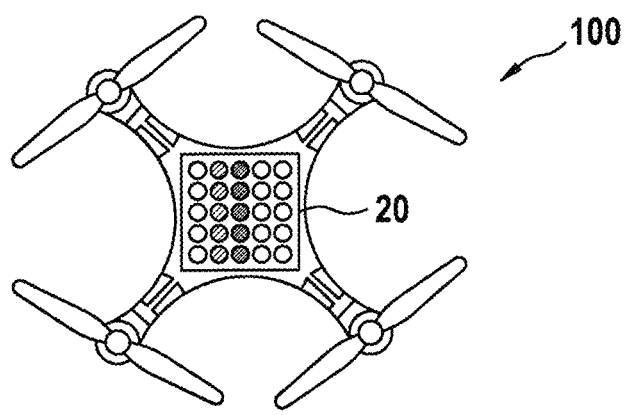
Figure 6C:
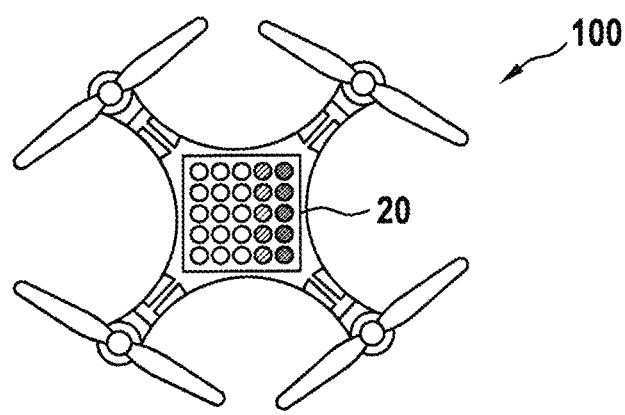

FIGS. 6A, 6B, and 6C illustrate the provision of a dynamic illumination pattern comprising a flight direction indication that is indicative of a momentary flight direction of the aerial vehicle 100 towards the right in the drawing plane of FIG. 6.

The dynamic illumination pattern comprises a line element that travels from left to right across the matrix of LEDs 20, i.e. that travels in a direction substantially aligned with the momentary flight direction of the aerial vehicle 100. FIGS. 6A, 6B, and 6C depict three snap shots in time of the line element travelling from left to right. The line element is orthogonal to the direction of travel from left to right, i.e. the line element is depicted as extending from top to bottom in the drawing plane of FIG. 6. In other words, the line element extends along a column of illumination points of the matrix of LEDs 20 in the drawing plane of FIG. 6. The line element is depicted as a single column of densely hatched illumination points.

Similar to the illumination patterns of FIG. 5, the dynamic illumination pattern of FIGS. 6A, 6B, and 6C comprises an afterglow effect. When the line element travels to a new position along its path from left to right, the previously illuminated subset of LEDs continues to be illuminated, albeit with a lower light intensity. In this way, the perceived dynamic of the flight direction indication is enhanced.

While the fully illuminated line element and the dimmed version of the previously illuminated line element are depicted as single columns of illumination points in the exemplary embodiment of FIGS. 6A, 6B, and 6C, it is understood that these elements of the illumination pattern may extend over larger numbers of illumination points. In particular, depending on the overall number of illumination points, the line elements may cover multiple illumination points in the direction of travel across the matrix of LEDs 20. Also, there may be provided different levels of dimming for different subsets of illumination points that were initially illuminated at different points in time during the provision of the dynamic illumination pattern. For example, it is possible that two or more levels of dimmed intensity line elements are provided on the back side of the fully illuminated line element.

The illuminated illumination points of the matrix of LEDs 20 may be illuminated in yellow or in any other suitable color.

Figure 6D:
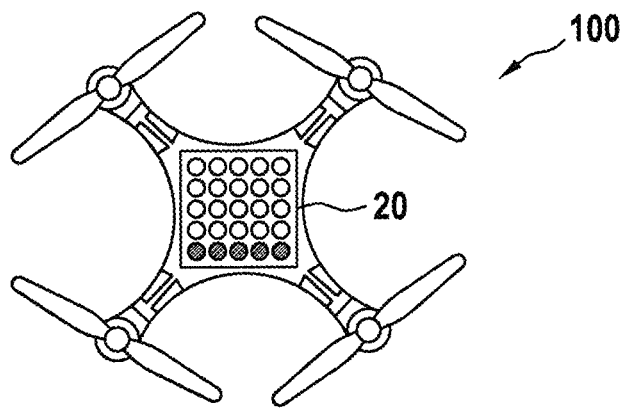
Figure 6E:
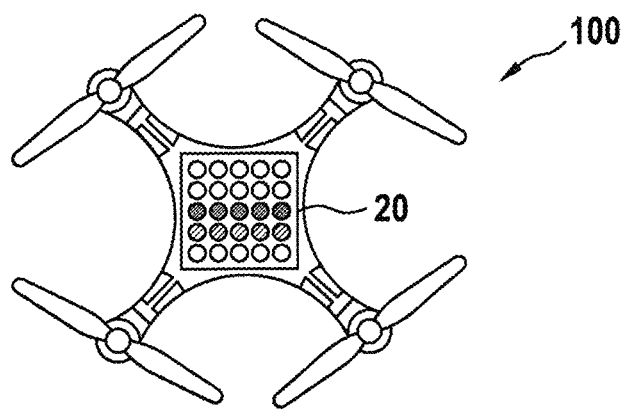
Figure 6F:
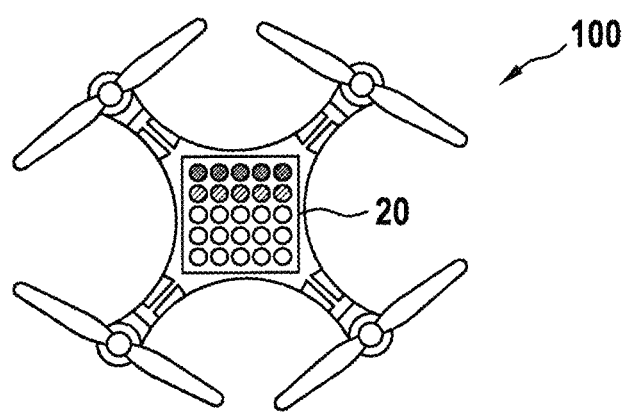

FIGS. 6D, 6E, and 6F illustrate the provision of a dynamic illumination pattern comprising a flight direction indication that is indicative of a momentary flight direction of the aerial vehicle 100 towards the top in the drawing plane of FIG. 6.

The dynamic illumination pattern of FIGS. 6D, 6E, and 6F is conceptually analogous to the dynamic illumination pattern of FIGS. 6A, 6B, and 6C, and reference is made to the detailed description of FIGS. 6A, 6B, and 6C.

Figure 6G:
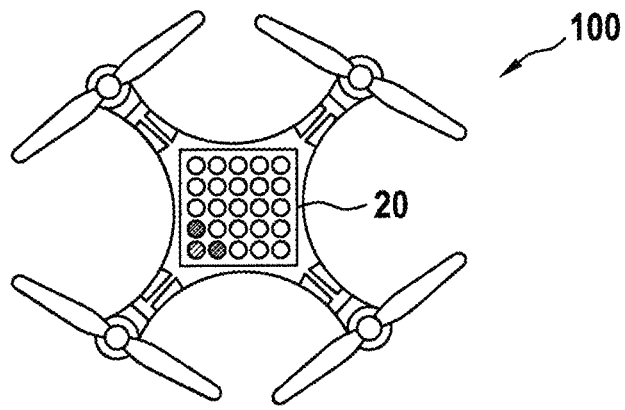
Figure 6H:
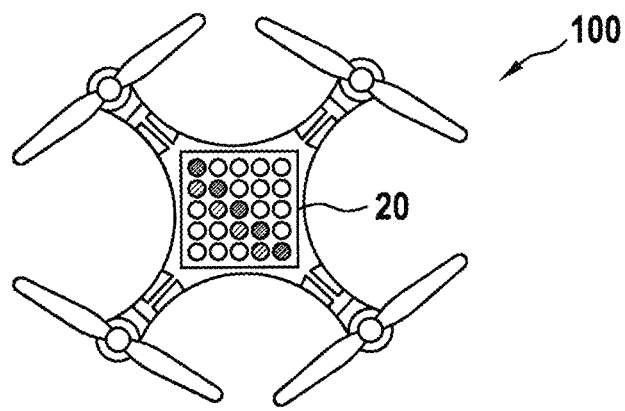
Figure 6I:
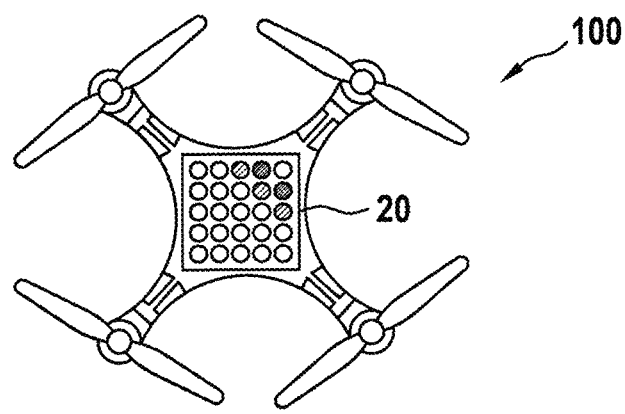

FIGS. 6G, 6H, and 6I illustrate the provision of a dynamic illumination pattern comprising a flight direction indication that is indicative of a momentary flight direction of the aerial vehicle 100 diagonally from the left bottom towards the right top in the drawing plane of FIG. 6.

The dynamic illumination pattern of FIGS. 6G, 6H, and 6I is conceptually analogous to the dynamic illumination pattern of FIGS. 6A, 6B, and 6C, and reference is made to the detailed description of FIGS. 6A, 6B, and 6C.

When expanding the illumination pattern concept of FIGS. 6A to 6I to cases where the aerial vehicle 100 travels from right to left or from the top to the bottom or in any of the other three diagonal directions in the drawing plane of FIG. 6, a total of eight different flight direction indications may be provided. The control unit may map the momentary flight direction of the aerial vehicle to the one of those eight flight direction indications that is closest to the momentary flight direction of the aerial vehicle. In particular, the control unit may map all momentary flight directions in a sector of 45°, which is the result of dividing the 360° full circle by eight, to a particular flight direction indication. While the flight direction indication will in most cases not be accurately aligned with the momentary flight direction, it is still indicative of the momentary flight direction and is substantially aligned therewith, approximating the momentary flight direction as much as possible. It is understood that a higher number of illumination points may allow for a better alignment between the momentary flight direction and the flight direction indication.

FIG. 7 shows an aerial vehicle 100 in accordance with an exemplary embodiment of the invention in a schematic bottom view, with the flight direction indication system of the aerial vehicle 100 providing exemplary flight direction indications. The depicted flight direction indications are the result of a method of indicating a flight direction of the aerial vehicle 100 in accordance with exemplary embodiments of the invention. The aerial vehicle 100 may be the aerial vehicle 100 of FIG. 1. For the purpose of clear illustration, many of the reference numbers of FIG. 1 are omitted from FIG. 7. Still, the description given with respect to FIG. 1 applies to FIG. 7 in an analogous manner.

Figure 7A:
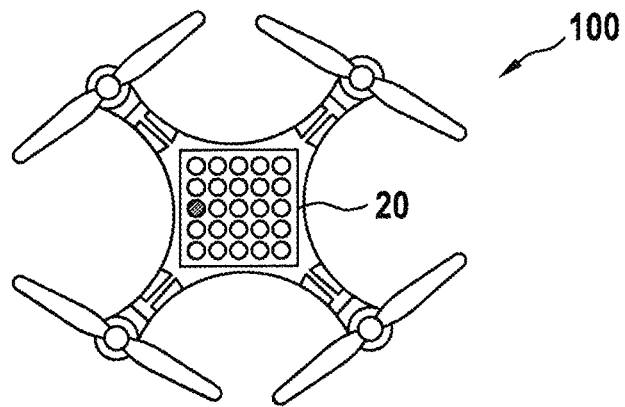
FIGS. 7A-7I show an aerial vehicle in accordance with an exemplary embodiment of the invention in a schematic bottom view, with the flight direction indication system of the aerial vehicle providing further exemplary flight direction indications.
Figure 7B:
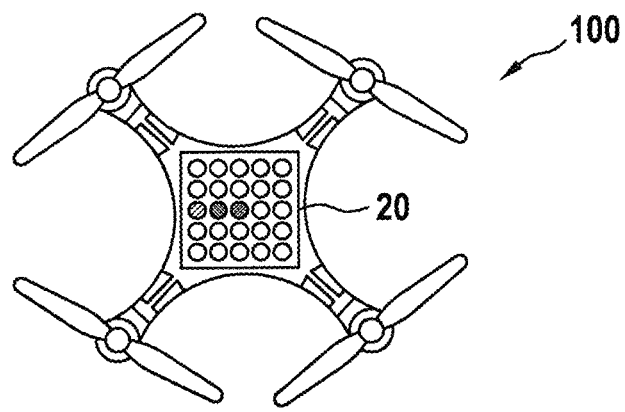
Figure 7C:
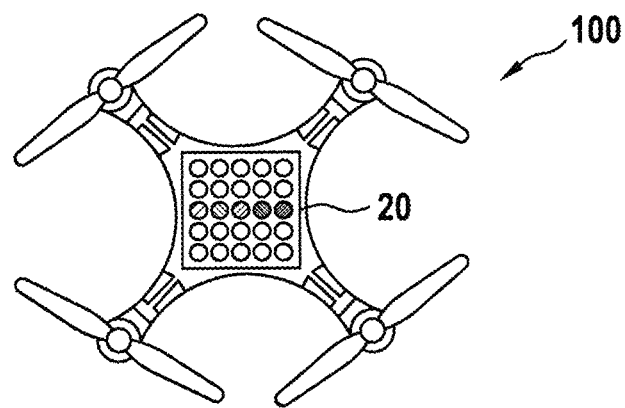

FIGS. 7A, 7B, and 7C illustrate the provision of a dynamic illumination pattern comprising a flight direction indication that is indicative of a momentary flight direction of the aerial vehicle 100 towards the right in the drawing plane of FIG. 7.

The dynamic illumination pattern comprises a line element that travels from left to right across the matrix of LEDs 20, i.e. that travels in a direction substantially aligned with the momentary flight direction of the aerial vehicle 100. FIGS. 7A, 7B, and 7C depict three snap shots in time of the line element travelling from left to right. The line element extends in the direction of travel across the matrix of LEDs 20, i.e. the line element extends from left to right in the drawing plane of FIG. 7. At the beginning of the travel from left to right, as depicted in FIG. 7A, only a front portion of the line element is visible, i.e. only the right-most portion of the line element is visible. This front portion of the line element is visible on the left side of the matrix of LEDs 20. Subsequently, the line element extends more and more towards the right into the matrix of LEDs 20, creating the perception of the front portion of the line element travelling towards the right, i.e. in the momentary flight direction of the aerial vehicle 100.

In the exemplary embodiment of FIGS. 7A, 7B, and 7C, the line element has a color gradient and an intensity gradient. The front portion of the line element, i.e. the portion towards the right of the line element, has a darker color and a higher light intensity than the back portion of the line element. The color and intensity gradients may for example be achieved with different shades/intensities of red, violet, orange, and yellow making up the line element.

Figure 7D:
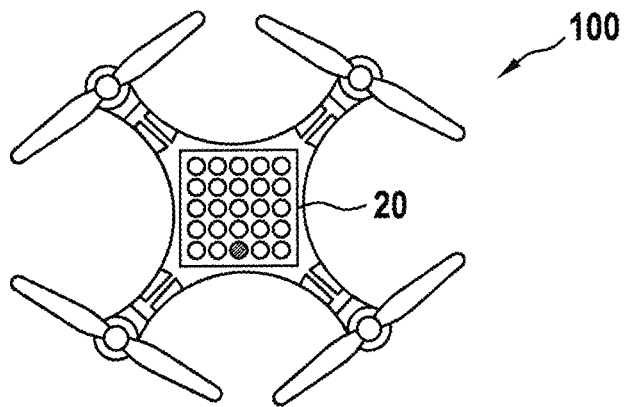
Figure 7E:
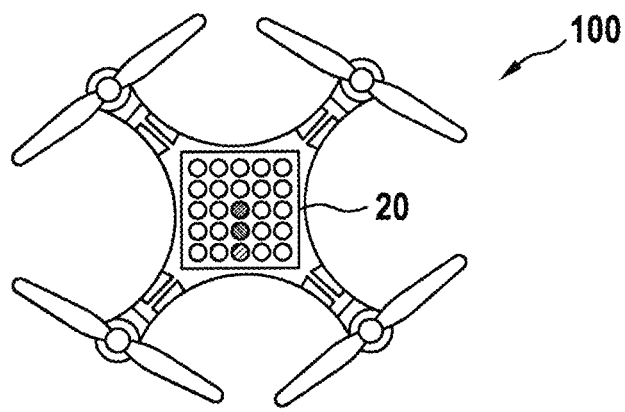
Figure 7F:
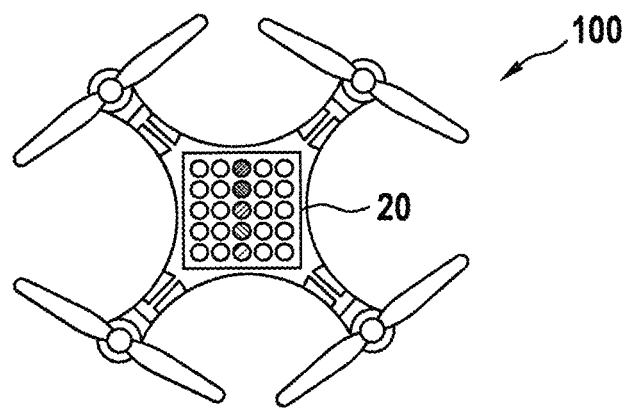

FIGS. 7D, 7E, and 7F illustrate the provision of a dynamic illumination pattern comprising a flight direction indication that is indicative of a momentary flight direction of the aerial vehicle 100 towards the top in the drawing plane of FIG. 7.

The dynamic illumination pattern of FIGS. 7D, 7E, and 7F is conceptually analogous to the dynamic illumination pattern of FIGS. 7A, 7B, and 7C, and reference is made to the detailed description of FIGS. 7A, 7B, and 7C.

Figure 7G:
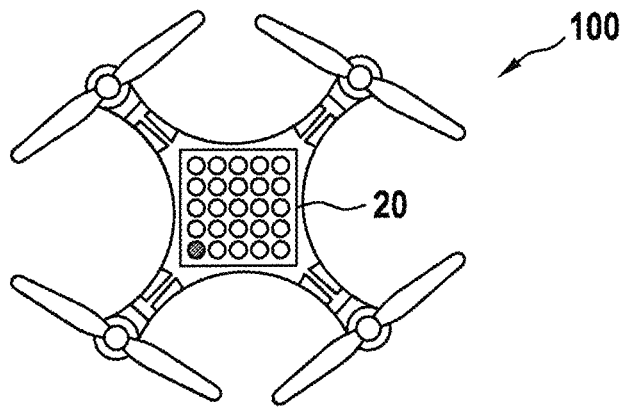
Figure 7H:
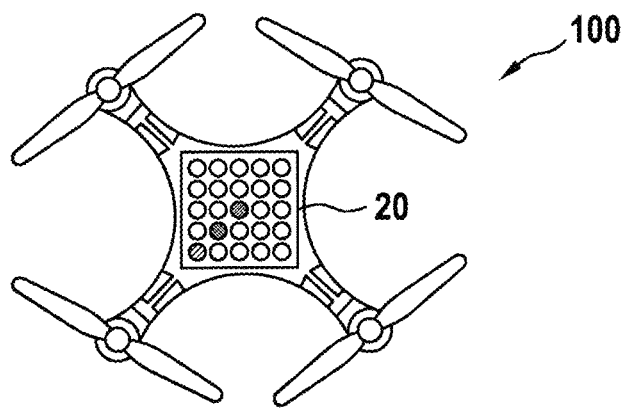
Figure 7I:
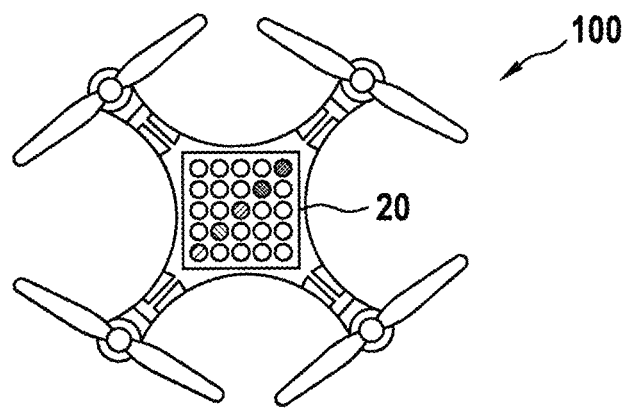

FIGS. 7G, 7H, and 7I illustrate the provision of a dynamic illumination pattern comprising a flight direction indication that is indicative of a momentary flight direction of the aerial vehicle 100 diagonally from the left bottom towards the right top in the drawing plane of FIG. 7.

The dynamic illumination pattern of FIGS. 7G, 7H, and 7I is conceptually analogous to the dynamic illumination pattern of FIGS. 7A, 7B, and 7C, and reference is made to the detailed description of FIGS. 7A, 7B, and 7C.

FIG. 8 shows an aerial vehicle 100 in accordance with an exemplary embodiment of the invention in a schematic bottom view, with the flight direction indication system of the aerial vehicle 100 providing exemplary flight direction indications. The depicted flight direction indications are the result of a method of indicating a flight direction of the aerial vehicle 100 in accordance with exemplary embodiments of the invention. The aerial vehicle 100 may be the aerial vehicle 100 of FIG. 1. For the purpose of clear illustration, many of the reference numbers of FIG. 1 are omitted from FIG. 8. Still, the description given with respect to FIG. 1 applies to FIG. 8 in an analogous manner.

Figure 8A:
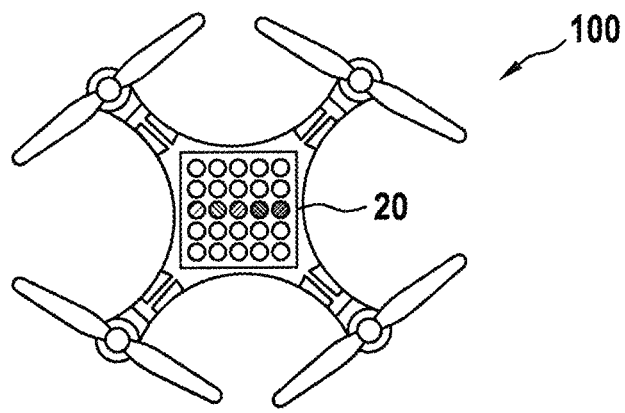
FIGS. 8A-8C show an aerial vehicle in accordance with an exemplary embodiment of the invention in a schematic bottom view, with the flight direction indication system of the aerial vehicle providing further exemplary flight direction indications.

FIG. 8A illustrates the provision of a static illumination pattern comprising a flight direction indication that is indicative of a momentary flight direction of the aerial vehicle 100 towards the right in the drawing plane of FIG. 8.

The static illumination pattern comprises a line element that extends from left to right across the matrix of LEDs 20, i.e. that extends in a direction substantially aligned with the momentary flight direction of the aerial vehicle 100. The line element has a color gradient and an intensity gradient. The front portion of the line element, i.e. the portion towards the right of the line element, has a darker color and a higher light intensity than the back portion of the line element, i.e. the portion towards the left of the line element. In this way, the front portion of the line element can be distinguished from the back portion of the line element. The color and intensity gradients may for example be achieved with different shades/intensities of red, violet, orange, and yellow making up the line element.

As an alternative, the static illumination pattern may comprise a flight direction indication symbol, such as an arrow, pointing towards the right in the drawing plane of FIG. 8, i.e. pointing into the momentary flight direction of the aerial vehicle 100. When starting from the line element of FIG. 8A, the arrow may be achieved by illuminating additional illumination points that make up the arrow tip. The arrow may have a color and/or intensity gradient or may have a uniform color and intensity. In other words, the flight direction indication may be provided via the shape of the flight direction indication symbol or via the shape of the flight direction indication symbol, supplemented by a color and/or intensity gradient.

Figure 8B:
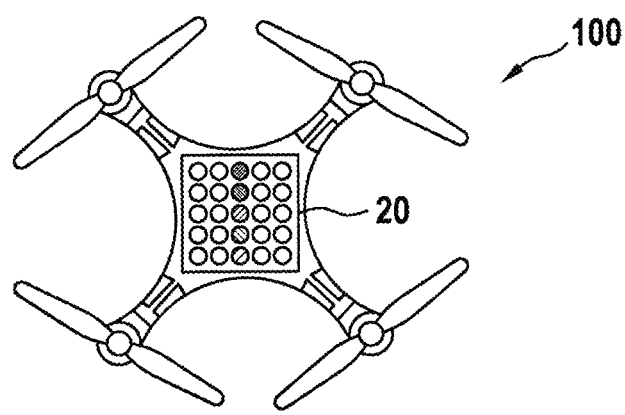

FIG. 8B illustrates the provision of a static illumination pattern comprising a flight direction indication that is indicative of a momentary flight direction of the aerial vehicle 100 towards the top in the drawing plane of FIG. 8.

The static illumination pattern of FIG. 8B is conceptually analogous to the static illumination pattern of FIG. 8A, and reference is made to the detailed description of FIG. 8A.

Figure 8C:
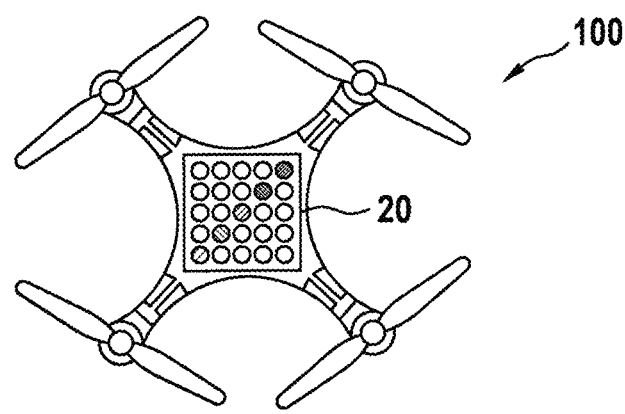

FIG. 8C illustrates the provision of a static illumination pattern comprising a flight direction indication that is indicative of a momentary flight direction of the aerial vehicle 100 diagonally from the left bottom towards the right top in the drawing plane of FIG. 8.

The static illumination pattern of FIG. 8C is conceptually analogous to the static illumination pattern of FIG. 8A, and reference is made to the detailed description of FIG. 8A.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. A method of indicating a flight direction of an aerial vehicle having a vehicle body and a plurality of rotors supported by the vehicle body, the method comprising:

on the basis of a momentary flight direction of the aerial vehicle, controlling a matrix of light sources which are mounted to the vehicle body of the aerial vehicle, to provide an illumination pattern to an observer of the aerial vehicle, with the illumination pattern comprising a flight direction indication, indicative of the momentary flight direction of the aerial vehicle,
wherein the matrix of light sources is a substantially two-dimensional array of light sources, the array having a plurality of rows and columns of light sources;
wherein the illumination pattern comprises a vertical flight direction indication, indicative of a vertical component of the momentary flight direction of the aerial vehicle via a dynamic illumination pattern, wherein instances of illumination are shorter than 1 s;
wherein the dynamic illumination pattern comprises a frame-like element, dynamically collapsing towards the center of the matrix of light sources, in response to the vertical component of the momentary flight direction being downwards; and
wherein the dynamic illumination pattern comprises a frame-like element, dynamically expanding towards the edges of the matrix of light sources, in response to the vertical component of the momentary flight direction being upwards.

2. The method according to claim 1, wherein the matrix of light is mounted to a lower side of the vehicle body of the aerial vehicle and wherein the illumination pattern is provided to an observer below the aerial vehicle.

3. The method according to claim 1, wherein the matrix of light sources is mounted to an upper side of the vehicle body of the aerial vehicle and wherein the illumination pattern is provided to an observer above the aerial vehicle.

4. The method according to claim 1,
wherein the frame like element that dynamically collapses towards the center of the matrix of light sources, in response to the vertical component of the momentary flight direction being downwards is a red frame-like element,
and
wherein the frame like element that dynamically expands towards the edges of the matrix of light sources, in response to the vertical component of the momentary flight direction being upwards is a green frame-like element.

5. The method according to claim 1, wherein the illumination pattern comprises a horizontal flight direction indication, indicative of a horizontal component of the momentary flight direction of the aerial vehicle.

6. The method according to claim 5, wherein the illumination pattern comprises a line element, dynamically travelling across the matrix of light sources, with the line element in particular travelling across the matrix of light sources substantially in its longitudinal direction of extension or substantially transverse to its longitudinal direction of extension.

7. The method according to claim 5, wherein the illumination pattern comprises a static line element, having a color gradient and/or intensity gradient along its longitudinal direction of extension, or a static flight direction indication symbol, such as an arrow.

8. A flight direction indication system for an aerial vehicle having a vehicle body and a plurality of rotors supported by the vehicle body, comprising:
a matrix of light sources mountable to the vehicle body of the aerial vehicle; and
a control unit, coupled to the matrix of light sources;
wherein the control unit is configured to control the matrix of light sources on the basis of a momentary flight direction of the aerial vehicle to provide an illumination pattern to an observer of the aerial vehicle, with the illumination pattern comprising a flight direction indication, indicative of the momentary flight direction of the aerial vehicle,
wherein the matrix of light sources is a substantially two-dimensional array of light sources, the array having a plurality of rows and columns of light sources,
wherein the illumination pattern comprises a vertical flight direction indication, indicative of a vertical component of the momentary flight direction of the aerial vehicle via a dynamic illumination pattern, wherein instances of illumination are shorter than 1 s,
wherein the dynamic illumination pattern comprises a frame-like element, dynamically collapsing towards the center of the matrix of light sources, in response to the vertical component of the momentary flight direction being downwards, and
wherein the dynamic illumination pattern comprises a frame-like element, dynamically expanding towards the edges of the matrix of light sources, in response to the vertical component of the momentary flight direction being upwards.

9. The flight direction indication system according to claim 8, further comprising:
a light unit housing and a lens cover, wherein the matrix of light sources is arranged within the light unit housing and is covered by the lens cover and wherein the light unit housing is receivable in a corresponding recess of the vehicle body of the aerial vehicle.

10. The flight direction indication system according to claim 8, further comprising:
a flight direction sensor for detecting the momentary flight direction of the aerial vehicle; or
a flight direction signal input for receiving a flight direction signal indicative of the momentary flight direction of the aerial vehicle.

11. An aerial vehicle, comprising:
a vehicle body,
a plurality of rotors supported by the vehicle body, and
a flight direction indication system, comprising:
a matrix of light sources mountable to the vehicle body of the aerial vehicle; and
a control unit, coupled to the matrix of light sources;
wherein the control unit is configured to control the matrix of light sources on the basis of a momentary flight direction of the aerial vehicle to provide an illumination pattern to an observer of the aerial vehicle, with the illumination pattern comprising a flight direction indication, indicative of the momentary flight direction of the aerial vehicle,
wherein the matrix of light sources is a substantially two-dimensional array of light sources, the array having a plurality of rows and columns of light sources,
wherein the illumination pattern comprises a vertical flight direction indication, indicative of a vertical component of the momentary flight direction of the aerial vehicle via a dynamic illumination pattern, wherein instances of illumination are shorter than 1 s,
wherein the dynamic illumination pattern comprises a frame-like element, dynamically collapsing towards the center of the matrix of light sources, in response to the vertical component of the momentary flight direction being downwards, and
wherein the dynamic illumination pattern comprises a frame-like element, dynamically expanding towards the edges of the matrix of light sources, in response to the vertical component of the momentary flight direction being upwards.

12. Aerial vehicle according to claim 11, wherein the plurality of rotors comprises between 3 and 10 rotors, in particular between 4 and 8 rotors, further in particular 4 rotors or 8 rotors.

* * * * *